United States Patent
Takeuchi et al.

(10) Patent No.: US 8,654,498 B2
(45) Date of Patent: Feb. 18, 2014

(54) ELECTROMECHANICAL DEVICE, MOVABLE BODY, ROBOT, METHOD OF MEASURING TEMPERATURE OF ELECTROMECHANICAL DEVICE

(75) Inventors: Kesatoshi Takeuchi, Shiojiri (JP); Katsuhiko Nishizawa, Shiojiri (JP)

(73) Assignee: Seiko Epson Corporation (JP)

(*) Notice: Subject to any disclaimer, the term of this patent is extended or adjusted under 35 U.S.C. 154(b) by 178 days.

(21) Appl. No.: 13/371,753

(22) Filed: Feb. 13, 2012

(65) Prior Publication Data

US 2012/0206850 A1    Aug. 16, 2012

(30) Foreign Application Priority Data

Feb. 14, 2011   (JP) ................................. 2011-028280

(51) Int. Cl.
*H01H 47/00* (2006.01)

(52) U.S. Cl.
USPC ........................................................ 361/140

(58) Field of Classification Search
USPC ........................................................ 361/140
See application file for complete search history.

(56) References Cited

U.S. PATENT DOCUMENTS

| | | | | |
|---|---|---|---|---|
| 4,119,894 A | * | 10/1978 | Sorensen | 318/783 |
| 6,163,912 A | * | 12/2000 | Matsuura et al. | 8/159 |
| 8,013,565 B2 | * | 9/2011 | Miura | 318/811 |
| 8,405,341 B2 | * | 3/2013 | Tagome | 318/722 |

FOREIGN PATENT DOCUMENTS

| | | |
|---|---|---|
| JP | 59-072993 | 4/1984 |
| JP | 01-185192 | 7/1989 |
| JP | 02-060494 | 2/1990 |
| JP | 08-009696 | 1/1996 |
| JP | 08-322281 | 12/1996 |
| JP | 09-023616 | 1/1997 |
| JP | 09-074796 | 3/1997 |
| JP | 2010-240952 | 10/2010 |

* cited by examiner

*Primary Examiner* — Stephen W Jackson
(74) *Attorney, Agent, or Firm* — Harness, Dickey & Pierce, P.L.C.

(57) ABSTRACT

An electromechanical device includes a rotor, a stator having a magnetic coil, a sensor adapted to detect an electric angle of the rotor, a control section adapted to perform a PWM drive on the magnetic coil based on a signal from the sensor, a resistor connected in series to the magnetic coil when measuring temperature of the electromechanical device, and a voltage measurement section adapted to measure a voltage between both ends of the resistor, and the control section calculates an electric resistance of the magnetic coil using the voltage between the both ends of the resistor measured by the voltage measurement section, and then determines the temperature of the magnetic coil using the electric resistance of the magnetic coil in a measurement period in which application of a drive voltage to the magnetic coil is stopped in the PWM drive.

16 Claims, 12 Drawing Sheets

FIG. 2A
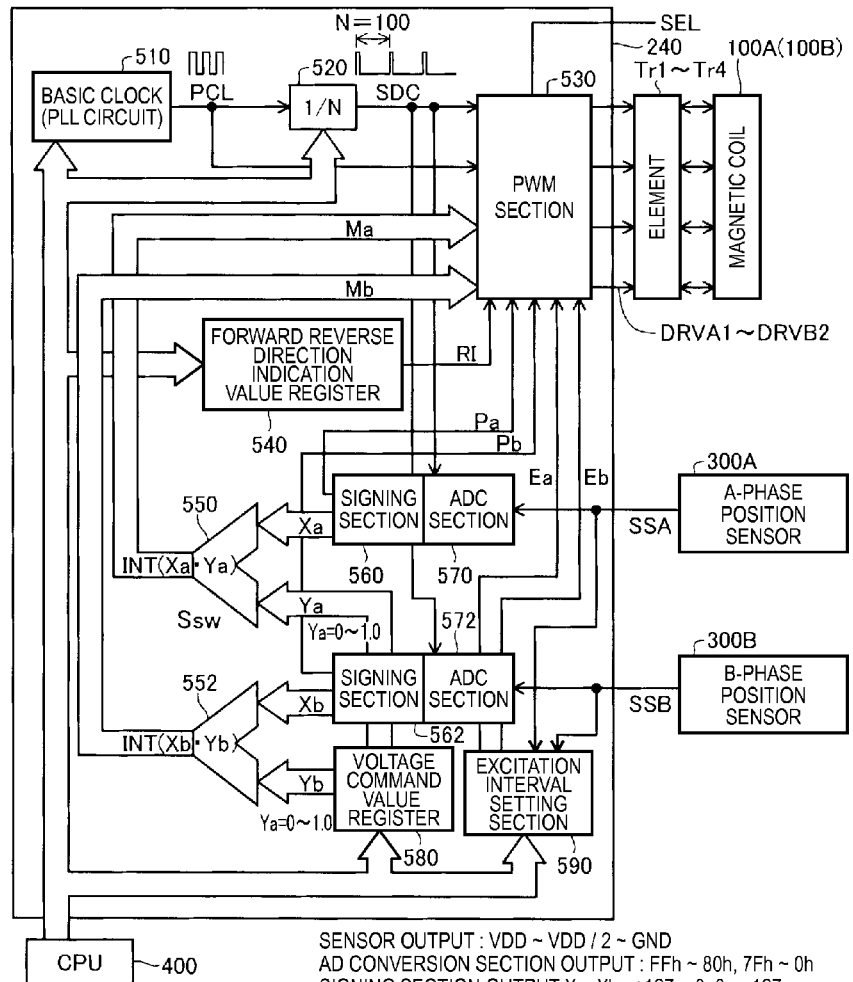
FIG. 2B
FIG. 2C
FIG. 2D
FIG. 2E

※ TEMPERATURE COEFFICIENT    0.004264 ppm / °C

|    | UNIT | MAGNETIC COIL TEMPERATURE | | | | |
|----|------|------|------|------|------|------|
|    |      | 20 [°C] | 40 [°C] | 60 [°C] | 80 [°C] | 100 [°C] |
| Rc | [Ω]  | 20.000 | 21.706 | 25.408 | 31.909 | 42.795 |
| Rx | [Ω]  | 10 | 10 | 10 | 10 | 10 |
| Ec | [V]  | 5 | 5 | 5 | 5 | 5 |
| Ex | [V]  | 1.667 | 1.577 | 1.412 | 1.193 | 0.947 |

FIG. 6

COUNTER-ELECTROMOTIVE FORCE CONSTANT                    Ke    0.55 [Vs / rad]
NON-EXCITATION COUNTER-ELECTROMOTIVE FORCE CONSTANT     Kc    0.0275 [Vs / rad]

| CHARACTERISTICS | SYMBOL | UNIT | PARAMETER | | | | |
|---|---|---|---|---|---|---|---|
| ROTATIONAL FREQUENCY | N | [rpm] | 0 | 100 | 500 | 1000 | 5000 |
| ANGULAR VELOCITY | ω | [rad / s] | 0.00 | 10.47 | 52.36 | 104.72 | 523.60 |
| INDUCED ELECTROMOTIVE FORCE | Eg | [V] | 0.0 | 5.8 | 28.8 | 57.6 | 288.0 |
| NON-EXCITATION INDUCED ELECTROMOTIVE FORCE | Ec | [V] | 0.0 | 0.3 | 1.4 | 2.9 | 14.4 |

FIG. 7

ELECTROMECHANICAL DEVICE, MOVABLE BODY, ROBOT, METHOD OF MEASURING TEMPERATURE OF ELECTROMECHANICAL DEVICE

BACKGROUND

1. Technical Field

The present invention relates to a technology for measuring the temperature of an electromechanical device without using a temperature sensor.

2. Related Art

An electromechanical device (an electric drive system) has been suppressing an amount of electrical current using the current feedback control within the rated current in order to operate within the rated current of the robot control and so on. Therefore, there has been no other robot control than the robot control slow in action and lacking an instantaneous force.

However, in recent robot control, it is conceivable that increasing importance is given to the instantaneous maximum torque characteristics of instantaneously performing the torque control with the torque N times as strong as the rated torque of the motor characteristics by applying a current N times as large as the rated current for a short period of t/N.

For example, a robot like a baseball player acts at a moderate speed in an ordinary motion, but in the case of coming to bat as a home run hitter, the torque with which the momentum several time through several tens of times as large as the normal momentum is applied to the thrown ball on the 0.1 second time scale is required to achieve the home run. Such a robot capable of generating the torque for the several tens of times of momentum for a short period is realized.

To that end, it is necessary to perform the torque (current) control for achieving the instantaneous maximum torque characteristics while monitoring the temperature in real time so that the temperature of a coil in an electric motor does not reach a predetermined temperature instead of controlling the amount of current from the beginning.

In essence, the performance of the motor is determined by the instantaneous maximum torque characteristics, and the method of preventing the temperature from reaching a predetermined level while monitoring the rise in temperature due to the copper loss, the iron loss, and the mechanical loss at that occasion becomes important.

In the magnet coil causing the copper loss, which is the most significant factor of the rise in temperature among these losses, it leads that the torque (current) control is freely performed within the assured temperature range.

Therefore, the explanation will be presented citing a coreless motor in which the iron loss is hardly generated and the rise in temperature due to the copper loss in the magnetic coil is dominant. Here, in order to measure the temperature of an electromechanical device, it is necessary to separately provide a temperature sensor as described in JP-A-2010-240952 (Document 1).

If it is attempted to directly measure the temperature of the magnetic coil with the copper loss, it is required to directly dispose a temperature sensor to the magnetic coil of the electromechanical device (the electric drive system) as described in Document 1. However, there arises a problem that it is difficult to prepare a space for directly attaching the temperature sensor to the magnetic coil.

SUMMARY

An advantage of some aspects of the invention is to measure the temperature of the electromechanical device and the magnetic coil without attaching a separate temperature sensor in the vicinity of the magnetic coil.

APPLICATION EXAMPLE 1

This application example of the invention is directed to an electromechanical device including a rotor, a stator having a magnetic coil, a sensor adapted to detect an electric angle of the rotor, a control section adapted to perform a PWM drive on the magnetic coil based on a signal from the sensor, a resistor connected in series to the magnetic coil when measuring temperature of the electromechanical device, and a voltage measurement section adapted to measure a voltage between both ends of the resistor, wherein the control section calculates an electric resistance of the magnetic coil using the voltage between the both ends of the resistor measured by the voltage measurement section, and then determines the temperature of the magnetic coil using the electric resistance of the magnetic coil in a measurement period in which application of a drive voltage to the magnetic coil is stopped in the PWM drive.

According to this application example, since the voltage between the both ends of the resistor is measured, the electric resistance of the magnetic coil is obtained using the voltage, and the temperature of the magnetic coil is obtained using the electric resistance of the magnetic coil in the period of stopping application of the drive voltage to the magnetic coil, the temperature of the electromechanical device can be measured without attaching the separate temperature obtaining section in the vicinity of the magnetic coil.

APPLICATION EXAMPLE 2

This application example of the invention is directed to the electromechanical device of Application Example 1, wherein the control section selects a period including an inflection point of an induced voltage caused in the magnetic coil as the measurement period, and performs the measurement of the voltage between the both ends of the resistor in the measurement period.

According to this application example, since the drive force by the magnetic coil is weak by its nature in the period including the inflection point of the induced voltage caused in the magnetic coil, if the drive force applied to the magnetic coil is stopped for measuring the temperature, the influence on the rotational speed and the torque of the electromechanical device is small. Therefore, it is possible to execute the temperature measurement without exerting a significant influence on the operation of the electromechanical device.

APPLICATION EXAMPLE 3

This application example of the invention is directed to the electromechanical device of Application Example 1 or 2, wherein the control section includes a constant-current source adapted to make a current flowing through the magnetic coil constant in the period in which the application of the drive voltage to the magnetic coil is stopped, and the control section selects a period including an inflection point of an induced voltage caused in the magnetic coil as the measurement period, and performs the measurement of the voltage between the both ends of the resistor in a condition of making the current flowing through the magnetic coil constant using the constant-current source in the measurement period.

According to this application example, it is possible to execute the temperature measurement while suppressing the influence on the rotational speed of the electromechanical device.

APPLICATION EXAMPLE 4

This application example of the invention is directed to the electromechanical device of Application Example 1, wherein the control section selects a period including a point at which an induced voltage caused in the magnetic coil takes one of a local maximum value and a local minimum value as the measurement period, and in the measurement period, stops driving the magnetic coil and performs the measurement of the voltage between the both ends of the resistor.

According to this application example, since the temperature of the magnetic coil can be measured in the period in which the induced voltage caused in the magnetic coil takes a local maximum value, and the variation in the induced voltage is small, accurate temperature measurement becomes possible.

APPLICATION EXAMPLE 5

This application example of the invention is directed to the electromechanical device according to any of Application Examples 1 to 4, wherein the control section includes a table used for calculating the temperature of the magnetic coil from the voltage between the both ends of the electric resistance measured.

According to this application example, the temperature of the magnetic coil can directly be obtained from the voltage between the both ends of the resistor.

APPLICATION EXAMPLE 6

This application example of the invention is directed to a movable body including the electromechanical device of any of Application Examples 1 to 5.

According to this application example, by performing the torque (current) control for achieving the instantaneous maximum torque characteristics while monitoring the temperature in real time so that the temperature of a coil in the electromechanical device used in the movable body does not reach a predetermined temperature, excellent acceleration can be achieved.

APPLICATION EXAMPLE 7

This application example of the invention is directed to a robot including the electromechanical device of any of Application Example 1 to 5.

According to this application example, it is possible to perform the torque (current) control for achieving the instantaneous maximum torque characteristics while monitoring the temperature in real time so that the temperature of a coil in the electromechanical device used for the robot does not reach a predetermined temperature.

APPLICATION EXAMPLE 8

This application example of the invention is directed to a method of measuring temperature of an electromechanical device including setting a measurement period in which the temperature of the electromechanical device is measured, stopping driving a magnetic coil of the electromechanical device in the measurement period, connecting a resistor in series to the magnetic coil, measuring a voltage between both ends of the resistor in the measurement period, calculating electric resistance of the magnetic coil using the voltage, and determining the temperature of the magnetic coil from a value of the electric resistance.

It should be noted that the invention can be implemented in various forms such as an electromechanical device such as an electric motor or a power-generating device, an actuator, a robot, or a movable body using the electromechanical device.

BRIEF DESCRIPTION OF THE DRAWINGS

The invention will be described with reference to the accompanying drawings, wherein like numbers reference like elements.

FIGS. 2A through 2E are explanatory diagrams showing an internal configuration and an operation of a PWM control section.

FIG. 6 is an explanatory diagram showing an example of a relationship between the temperature and the resistance of the magnetic coil.

FIG. 7 is an explanatory diagram showing a relationship between the rotational frequency of the magnetic coil, an induced electromotive force, and a non-excitation induced electromotive force.

DESCRIPTION OF EXEMPLARY EMBODIMENTS

A. First Embodiment

Figure 1:
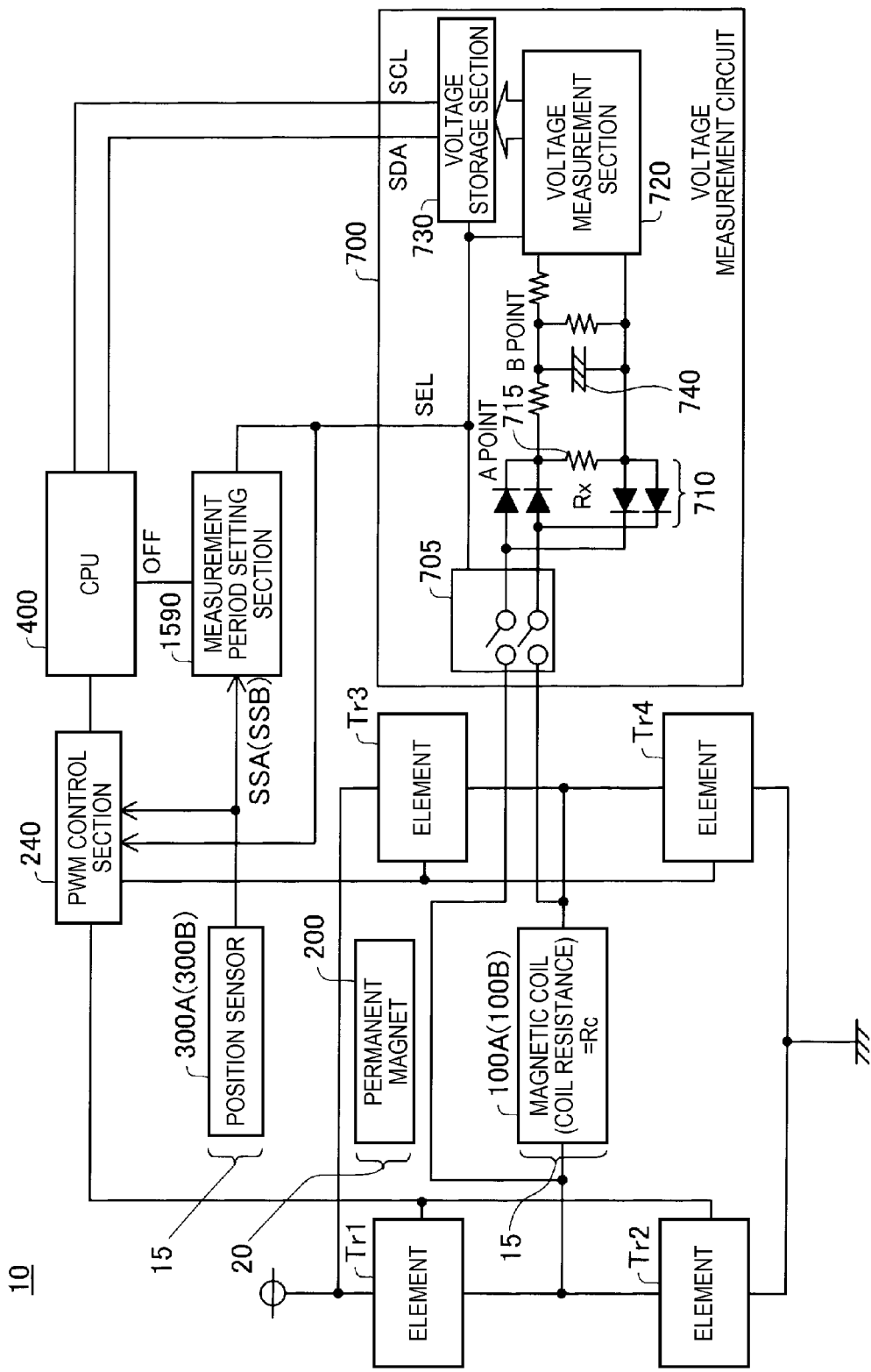
FIG. 1 is an explanatory diagram schematically showing a temperature measurement section of an electric motor according to a first embodiment of the invention.

FIG. 1 is an explanatory diagram schematically showing a temperature measurement section of an electric motor according to a first embodiment. An electric motor 10 is provided with a magnetic coil 100A, switching elements Tr1 through Tr4, a permanent magnet 200, a position sensor 300A, a PWM control section 240, a CPU 400, a measurement period setting section 1590, and a voltage measurement circuit 700. In the present embodiment, the permanent magnet 200 is disposed on a rotor 20, and the magnetic coil 100A (magnetic coil 100B) is disposed on a stator 15. It should be noted that in the present embodiment the electric motor 10 is a two-phase motor having two phases of A phase and B phase, and is also provided with the magnetic coil 100B and a position sensor 300B for the B phase in addition to the magnetic coil 100A and the position sensor 300A for the A phase. The magnetic coil 100A and the switching elements Tr1 through Tr4 constitute an H-bridge circuit, and when both of the switching elements, for example, the switching elements Tr1, Tr4, at diagonal positions on both sides of the magnetic coil 100A are switched ON and the switching elements Tr2, Tr3 are switched OFF, a current is applied to the magnetic coil 100A. Further, when, for example, the switching elements Tr1, Tr4 are switched OFF, and the switching elements Tr2, Tr3 are switched ON, a current is applied to the magnetic coil 100A. It should be noted that when all of the switching elements Tr1 through Tr4 are in the OFF state, since the switching elements Tr1 through Tr4 are high-impedance elements for the magnetic coil 100A, no current flows through the magnetic coil 100A although an induced electromotive force is generated therein. The same applies to the magnetic coil 100B.

The permanent magnet 200 is disposed corresponding to each of the magnetic coils 100A, 100B. When the current flows through the magnetic coils 100A, 100B, a Lorentz force acts between the permanent magnet and each of the magnetic coils 100A, 100B, and thus the rotor 20 rotates. The position sensor 300A is disposed in the vicinity of the magnetic coil 100B, and detects the electric angle of the permanent magnet 200. The position sensor 300B is disposed in the vicinity of the magnetic coil 100A, and detects the electric angle of the permanent magnet 200. The reason why the two position sensors 300A, 300B are provided in the present embodiment is to detect the rotational direction of the electric motor 10. Therefore, the two position sensors are disposed so that the sensor signals having the respective phases shifted by a value other than n×π (n denotes an integer) at electric angle from each other are generated. If the phases are shifted by n×π at electric angle from each other, the rotational direction of the electric motor 10 cannot be detected. It should be noted that the sensor signal SSA of the position sensor 300A and the sensor signal SSB of the position sensor 300B preferably have the respective phases shifted by π/2 at electric angle from each other. If the configuration in which the phase of the sensor signal SSA and the phase of the sensor signal SSB are shifted by π/2 at electric angle from each other is adopted, when one (e.g., the sensor signal SSA) of the sensor signals takes a local maximum value or a local minimum value, the other (e.g., the sensor signal SSB) thereof is located at an inflection point. The sensor signals SSA, SSB are input to the measurement period setting section 1590. A configuration of the measurement period setting section 1590 will be described later.

The voltage measurement circuit is provided with a magnetic coil connection switch 705, a bridge rectifier circuit 710, a voltage measurement section 720, a voltage storage section 730, a smoothing capacitor 740, and a resistor 715. The magnetic coil connection switch 705 connects the magnetic coils 100A, 100B to the bridge rectifier circuit 710 in accordance with a measurement period activation signal SEL from the measurement period setting section 1590. The resistor 715 is connected between the power side and the ground side of the outputs of the bridge rectifier circuit 710. The smoothing capacitor 740 is connected in parallel to the resistor 715. The voltage measurement section 720 measures the voltage between the both ends of the resistor 715 or the smoothing capacitor 740 in response to the measurement period activation signal SEL. The voltage storage section 730 is provided with various tables for calculating the temperature of the magnetic coils 100A, 100B from the voltage between the both ends of the resistor 715 or the smoothing capacitor 740 measured by the voltage measurement section 720. With reference to these tables, the CPU calculates the temperature of the magnetic coils 100A, 100B from the voltage between the both ends of the resistor 715 or the smoothing capacitor 740.

The CPU 400 and the voltage storage section 730 are connected to each other with a serial data line SDA and a serial clock line SCL. Using the serial data line SDA, the CPU 400 obtains the temperature data of the magnetic coils 100A, 100B from the voltage storage section 730.

FIGS. 2A through 2E are explanatory diagrams showing an internal configuration and an operation of a PWM control section. The PWM control section 240 is provided with a basic clock generation circuit 510, a 1/N divider 520, a PWM section 530, a forward reverse direction indication value register 540, multipliers 550, 552, signing sections 560, 562, AD conversion sections 570, 572, a voltage command value register 580, and an excitation interval setting section 590.

The basic clock generation circuit 510 is a circuit for generating a clock signal PCL having a predetermined frequency, and is formed of, for example, a PLL circuit. The divider 520 generates a clock signal SDC having the frequency 1/N of the frequency of the clock signal PCL. The value of N is set to a predetermined constant value. The value of N is set by the CPU 400 in advance in the divider 520. The PWM section 530 generates drive signals DRVA1, DRVA2, DRVB1, and DRVB2 in accordance with the clock signals PCL, SDC, multiplication values Ma, Mb supplied from the multipliers 550, 552, a forward reverse direction indication value RI supplied from the forward reverse direction indication value register 540, positive/negative sign signals Pa, Pb supplied from the signing sections 560, 562, and excitation interval signals Ea, Eb supplied from the excitation interval setting section 590.

The value RI indicating the rotational direction of the electric motor 10 is set by the CPU 400 in the forward reverse direction indication value register 540. In the present embodiment, the electric motor 10 rotates normally when the forward reverse direction indication value RI is in the L level, and reverses when it is in the H level.

Other signals Ma, Mb, Pa, Pb, Ea, Eb, and SEL supplied to the PWM section 530 are determined as follows. It should be noted that the multiplier 550, the signing section 560, and the AD conversion section 570 are circuits for the A phase, and the multiplier 552, the signing section 562, and the AD conversion section 572 are circuits for the B phase. Since the operations of the circuit groups are the same, hereinafter the operation of the circuit group for the A phase will mainly be explained. It should be noted that although hereinafter the explanation will be presented assuming that the parameters (e.g., an excitation interval described later) are set to the same value between the A phase and the B phase, it is also possible to set the parameters of the A phase and the B phase to respective values different from each other.

It should be noted that in the specification when collectively referring to the A phase and the B phase, the suffixes "a" and "b" (indicating the A phase and the B phase) of the symbols will be omitted. For example, if there is no need to distinguish the multiplication values Ma, Mb of the A phase and the B phase from each other, these values are collectively referred to as the "multiplication values M." The same applies to other symbols.

The sensor signal SSA of the position sensor 300A is supplied to the AD conversion section 570. The range of the sensor signal SSA of the position sensor 300A is, for example, from GND (the ground potential) to VDD (the power supply voltage), and the medium level point (=VDD/2) thereof corresponds to the medium level point (the point passing through the origin of a sine wave) of the output waveform. The AD conversion section 570 performs the AD conversion on the sensor signal SSA to thereby generate the digitalized value of the sensor output. The range of the output of the AD conversion section 570 is, for example, FFh through 0h (the suffix "h" represents that the number is a hexadecimal number), and the central value on the positive side is set to 80h, and the central value on the negative side is set to 7Fh, and these values are made to correspond to the medium level points of the waveform, respectively.

The signing section 560 converts the range of the sensor output value after the AD conversion, and at the same time sets the value of the medium level point of the sensor output value to zero. As a result, the sensor output value Xa generated by the signing section 560 takes a value in a predetermined range (e.g., +127 through 0) on the positive side or a predetermined range (e.g., 0 through −127) on the negative side. It should be noted that what is supplied from the signing section 560 to the multiplier 550 is the absolute value of the sensor output value Xa, and the positive/negative sign thereof is supplied to the PWM section 530 as the positive/negative sign signal Pa.

The voltage command value register 580 stores a voltage command value Ya set by the CPU 400. The voltage command value Ya functions as a value for setting the applied voltage to the electric motor 10 together with the excitation interval signal Ea described later. Although the voltage command value Ya typically takes a value of 0 through 1.0, it is also possible to arrange that a value larger than 1.0 can be set. It should be noted that it is hereinafter assumed that the voltage command value Ya takes a value in a range of 0 through 1.0. On this occasion, if the excitation interval signal Ea is set so as to set the entire interval to the excitation interval without providing a non-excitation interval, Ya=0 means that the applied voltage is set to zero, and Ya=1.0 means that the applied voltage is set to the maximum value. The multiplier 550 multiplies the sensor output value Xa output from the signing section 560 by the voltage command value Ya and then converts the result into an integer, and then supplies the PWM section 530 with the multiplication value Ma.

The PWM section 530 is provided with the measurement period activation signal SEL input thereto. The measurement period activation signal SEL is a signal generated by the measurement period setting section 1590 shown in FIG. 1. The measurement period activation signal SEL performs switching ON/OFF of the drive signals DRVA1, DRVA2, DRVB1, and DRVB2 output from the PWM section 530. Specifically, the measurement period activation signal SEL is activated to thereby inactivate the drive signals DRVA1, DRVA2, DRVB1, and DRVB2 in the case of measuring the temperature of the magnetic coils 100A, 100B. Specifically, the switching elements Tr1 through Tr4 shown in FIG. 1 are switched OFF.

FIGS. 2B through 2E each show the operation of the PWM section 530 in the case in which the multiplication value Ma takes a variety of values. Here, it is assumed that the entire period is the excitation interval, and no non-excitation interval exists. The PWM section 530 is a circuit for generating a single pulse having a duty ratio of Ma/N during each period of the clock signal SDC. Specifically, as shown in FIGS. 2B through 2E, the duty ratio of the pulse of the drive signals DRVA1, DRVA2 increases as the multiplication value Ma increases. It should be noted that although the first drive signal DRVA1 is a signal generating a pulse only when the sensor signal SSA is positive, and the second drive signal DRVA2 is a signal generating a pulse only when the sensor signal SSA is negative, these signals are described together with each other in FIGS. 2B through 2E. Further, the second drive signal DRVA2 is described as a negative pulse for the sake of convenience.

Figures 3A, 3B:
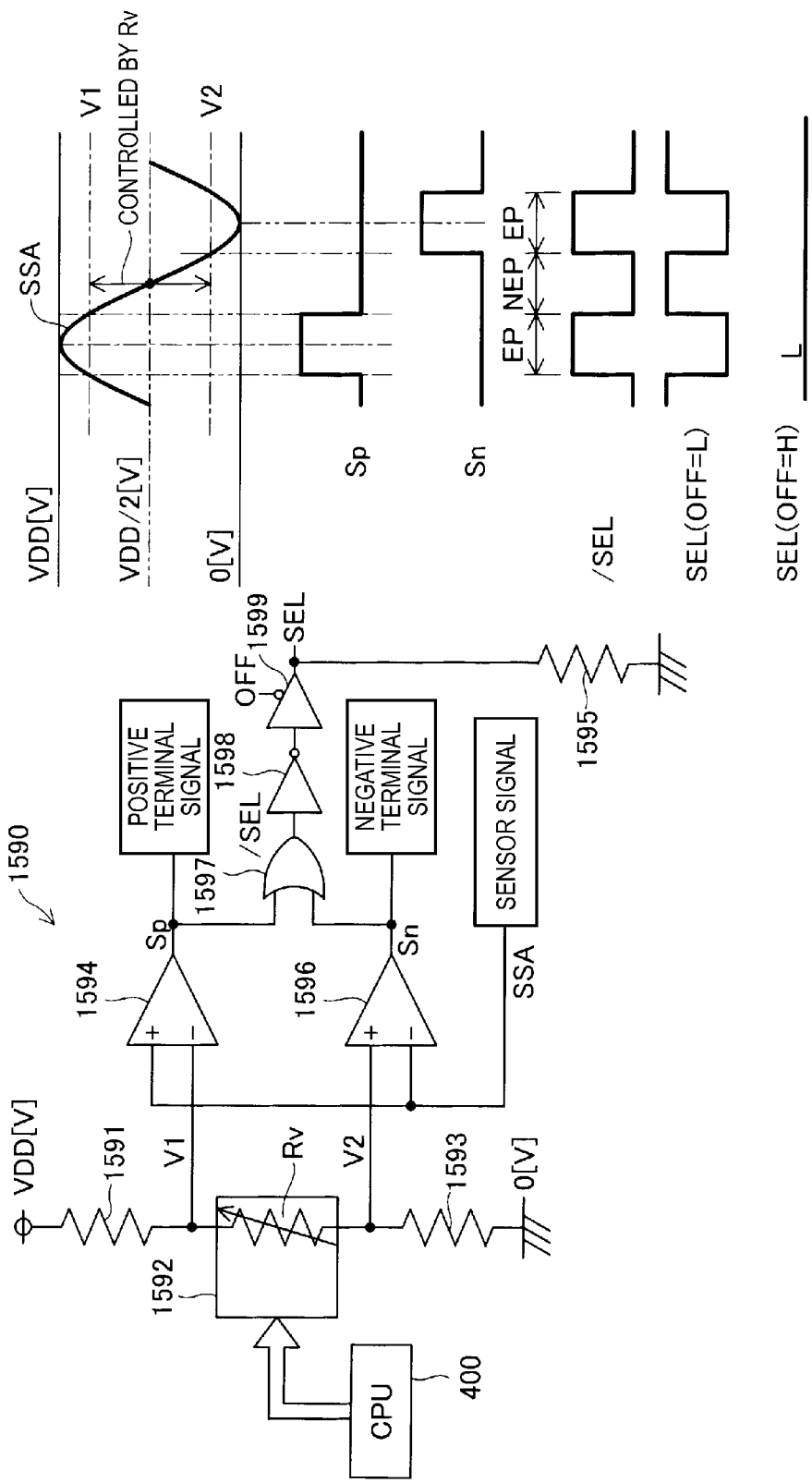
FIGS. 3A and 3B are explanatory diagrams showing a configuration of a measurement period setting section.

FIGS. 3A and 3B are explanatory diagrams showing a configuration of the measurement period setting section. The measurement period setting section 1590 is provided with resistors 1591, 1593, a pull-down resistor 1595, an electronic variable resistor 1592, voltage comparators 1594, 1596, an OR circuit 1597, an inverter circuit 1598, and a switch circuit 1599. The resistance value Rv of the electronic variable resistor 1592 is set by the CPU 400. The resistor 1591, the electronic variable resistor 1592, and the resistor 1593 are connected in series to each other. The voltages V1, V2 of the both ends of the electronic variable resistor 1592 are provided respectively to one input terminals of the voltage comparators 1594, 1596. The other input terminals of the voltage comparators 1594, 1596 are supplied with the sensor signal SSA of the position sensor 300A. It should be noted that the circuits for the B phase are omitted in FIG. 3A for the sake of convenience. Output signals Sp, Sn of the voltage comparators 1594, 1596 are input to the OR circuit 1597. An output signal /SEL of the OR circuit 1597 is inverted by the inverter circuit 1598 between the H level and the L level, and is then input to the switch circuit 1599. The switch circuit 1599 activates or inactivates the measurement period activation signal SEL in accordance with the value of a switching signal OFF. If the switching signal OFF is in the L level, the switch circuit 1599 outputs the inverted signal of the output signal /SEL of the OR circuit 1597 as the measurement period activation signal SEL. If the switching signal OFF is in the H level, due to the pull-down resistor 1595, the switch circuit 1599 outputs the L level as the measurement period activation signal SEL. The resistance value Rv of the electronic variable resistor 1592 determines the electric potential difference between the voltages V1, V2 to thereby determine the width of the measurement period activation signal SEL.

Figure 4:
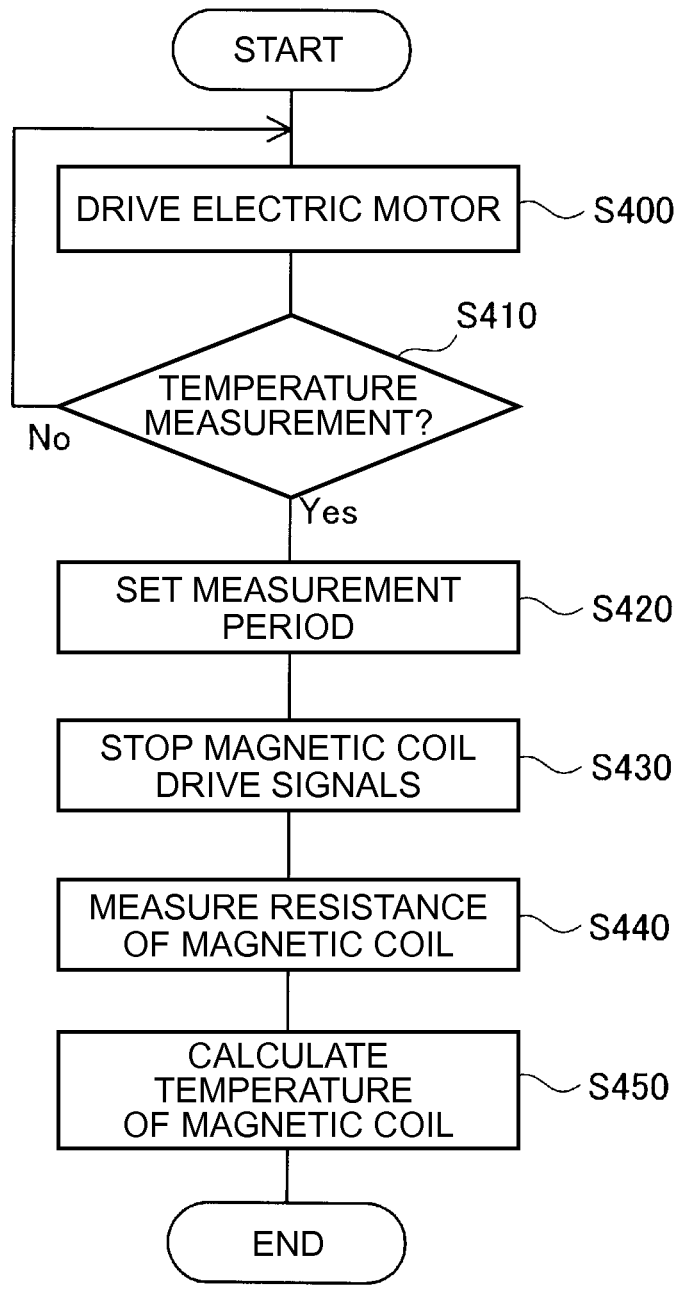
FIG. 4 is an explanatory diagram showing a flowchart in the temperature measurement.

FIG. 4 is an explanatory diagram showing a flowchart in the temperature measurement. In the step S400, the electric motor 10 is driven. In the step S410, the CPU 400 (FIG. 1) determines whether or not the temperature of the magnetic coils 100A, 100B is to be measured. For example, it is possible for the CPU 400 to measure the temperature of the magnetic coils 100A, 100B at regular time intervals. In the step S420, the CPU 400 sets the measurement period. As is understood from the circuit configuration, the measurement period setting section 1590 shown in FIG. 1 generates, as a goal, the inverted signal of the output signal /SEL based on the sensor signal SSA, and has a configuration of stopping the output with the H level from the switch circuit 1599 in accordance with the switching signal OFF. Therefore, the CPU 400 changes the switch signal OFF from the H level to the L level to thereby set the measurement period activation signal SEL to the H level, and thus sets the measurement period.

In the step S430, the PWM drive section 240 inactivates the drive signals DRVA1, DRVA2 to thereby switch OFF the switching elements Tr1 through Tr4 in the period in which the measurement period activation signal SEL is in the H level. In the step S440, using the serial communication of the I²C bus (SDA, SCL), the CPU 400 connects the resistance value Rx of the resistor 715 to the magnetic coils 100A, 100B with the magnetic coil connection switch 705 in the voltage measurement circuit 700. Here, the electric resistance Rc of the magnetic coil 100A can be calculated using the non-excitation induced voltage (non-excitation induced electromotive force) Ec, the voltage Eb measured by the voltage measurement section 720, and the resistance value Rx of the resistor 715. Here, the non-excitation induced voltage Ec is measured in the period in which the measurement period activation signal SEL is in the H level in real time of the electric angle π period, and is stored to the voltage storage section 730 in series to thereby be updated. In the step S450, the CPU 400 calculates the temperature of the magnetic coil 100A from the electric resistance Rc of the magnetic coil 100A, the voltage storage section 730, and the resistance value Rx of the resistor 715. It should be noted that although the explanation is presented assuming that the portion of the voltage drop of the bridge rectifier circuit 710 is 0[V] for the sake of convenience of explanation, a forward voltage drop Edf=0.6[V] is caused in reality.

Figure 5:
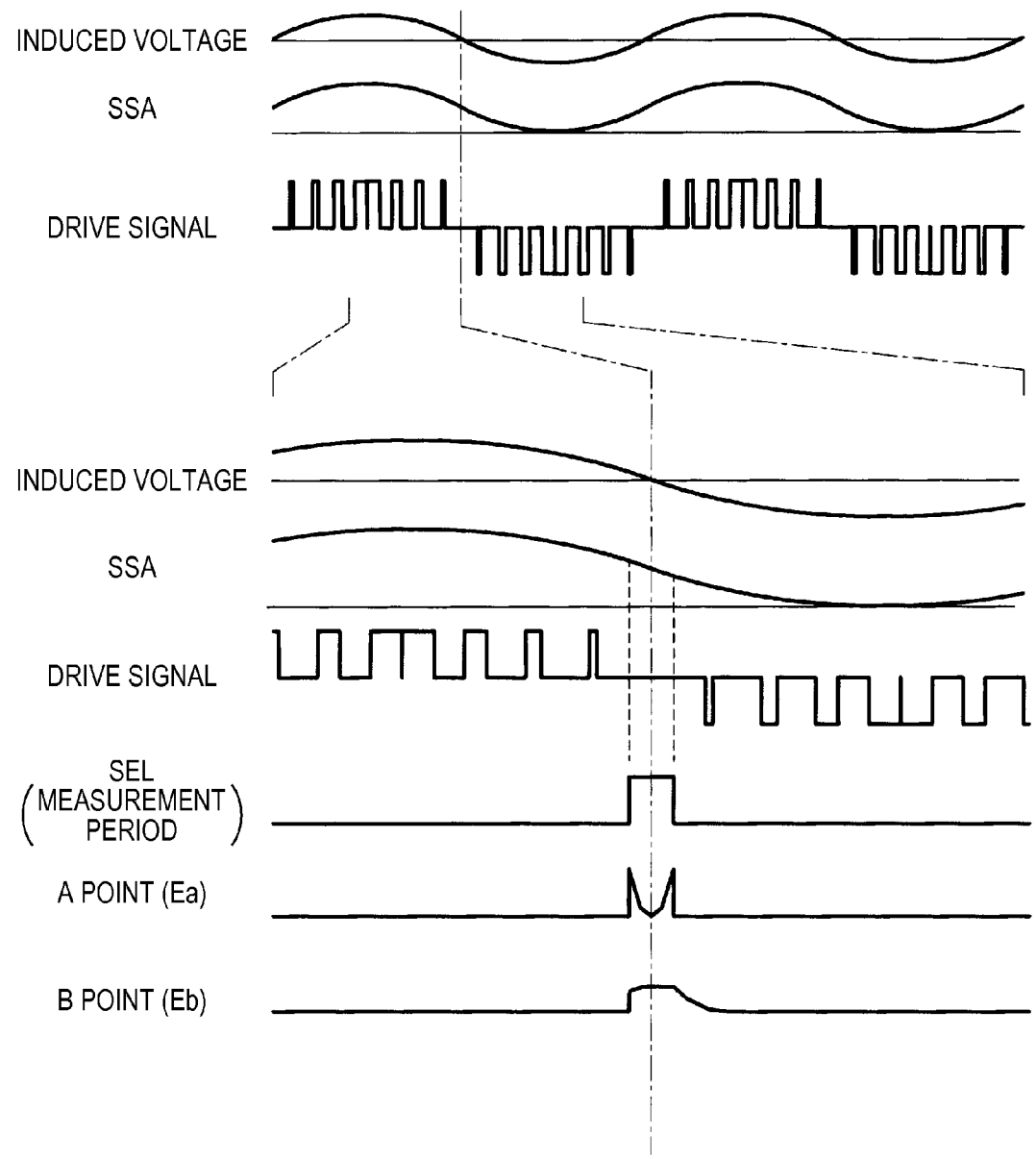
FIG. 5 is a timing chart of the temperature measurement of a magnetic coil in the present embodiment.

FIG. 5 is a timing chart of the temperature measurement of the magnetic coil in the present embodiment. Which timing is selected as the timing of activating the measurement period activation signal SEL can variously be set. In the present embodiment, the timing of activating the measurement period activating signal SEL is set within a range centered on the point (zero-cross point) at which the direction of the induced voltage caused in the magnetic coil changes. At this timing, since the drive signals DRVA1, DRVA2 are in the inactivated state, the switching elements Tr1 through Tr4 are in the OFF state. However, since the permanent magnet 200 moves with respect to the magnetic coil 100A due to the rotation of the rotor 20, a small induced electromotive force is generated in the magnetic coil 100A. It should be noted that the direction of the induced electromotive force changes from positive to negative since the zero-cross point.

The node of the resistor 715, which is shown in FIG. 1, and is located on the power supply side, is referred to as an A point. The waveform at the A point is the power supply side output of the bridge rectifier circuit 710, and is therefore the waveform of the absolute value of the waveform of the induced electromotive force. In other words, if the induced electromotive force is negative, the polarity is reversed to be positive. The induced electromotive force decreases toward the zero-cross point, and after the zero-cross point, the induced electromotive force increases toward the negative direction. Therefore, the waveform at the A point becomes a concave shape as shown in FIG. 5. The voltage of the A point is denoted by Ea (equal to the non-excitation induced voltage Ec in the present embodiment), the node of the smoothing capacitor 740, which is shown in FIG. 1, and is located on the power supply side, is referred to as a B point. The waveform at the B point is an electric potential of the smoothing capacitor 740, and becomes a waveform obtained by smoothing the waveform at the A point due to the current flowing into the smoothing capacitor 740 and the current flowing from the smoothing capacitor 740. Specific waveform becomes like a waveform shown in FIG. 5. The voltage Eb at the B point is measured by the voltage measurement section 720. Here, assuming that the value of the non-excitation induced voltage caused in the magnetic coil 100A is Ec, and the resistance value of the magnetic coil 100A is Rc, the voltage Eb at the B point can be expressed as $Eb=Ec \times Rx/(Rc+Rx)$, therefore, $Rc=(Ec \times Rx/Eb)-Rx$.

In other words, the voltage Eb is the voltage applied to the resistor 715 out of the voltages obtained by dividing the non-excitation induced voltage Ec by the resistance value Rx of the resistor 715 and the resistance value Rc of the magnetic coil 100A. Here, the resistance value Rx is a known value, the value Ec of the non-excitation induced voltage is calculated using the angular velocity ω derived from the non-excitation counter-electromotive force constant Kc, which is obtained by calculating the non-excitation period NEP from the counter-electromotive force constant Ke, and the rotational frequency N, and the voltage Eb due to the resistance value Rx of the resistor 715 is measured by the voltage measurement section 720 in the non-excitation period NEP and is then updated in the voltage storage section 730 in series. Therefore, the resistance Rc of the magnetic coil 100A can easily be calculated using the above formula.

FIG. 6 is an explanatory diagram showing an example of a relationship between the temperature and the resistance of the magnetic coil. A resistance R2 at certain temperature Ta is expressed as follows assuming that the resistance at 20° C. is R1 and the temperature coefficient is aa.

$R2=R1 \times (1+(Ta-20) \times aa)$

Here, aa is a temperature coefficient, and is determined by the material of the magnetic coil 100A. Therefore, if the resistance value R1 of the magnetic coil 100A at 20° C. is measured in advance, the temperature Ta of the magnetic coil 100A can easily be calculated by substituting the R2 with the resistance value Rc thus calculated.

FIG. 7 is a diagram tabulating the induced electromotive force Eg (voltage) and the non-excitation induced electromotive force Ec (voltage) corresponding to the rotational frequency N using the counter-electromotive force constant Ke of the electric motor 10 and the non-excitation counter-electromotive force constant Kc obtained by calculating the non-excitation period NEP due to the measurement period activation signal SEL.

(non-excitation induced electromotive force $Ec$)= (non-excitation counter-electromotive force constant $Kc$)×(angular velocity ω)[V]

The non-excitation induced electromotive force is an electromotive force of the magnetic coil 100A in the period in which the measurement period activation signal SEL is activated, and depends on the timing of activating the measurement period activation signal SEL and the length of the activated period. The example shown in FIG. 7 shows the case in which the timing of activating the measurement period activating signal SEL is set within the range centered on the point (zero-cross point) at which the direction of the induced voltage caused in the magnetic coil changes as shown in FIG. 5.

As described above, according to the present embodiment, by connecting the resistor 715 in series via the bridge rectifier circuit 710 and then measuring the voltage between the both ends of the resistor 715 (the smoothing capacitor 740) when measuring the temperature of the magnetic coil 100A, it is possible to calculate the electric resistance Rc of the magnetic coil 100A, and then calculate the temperature of the magnetic coil 100A using the electric resistance Rc and the electric resistance R1 of the magnetic coil 100A at 20° C. Therefore, the temperature of the magnetic coil 100A can be obtained without using the temperature sensor in the vicinity of the magnetic coil 100A.

In the vicinity of the zero-cross point of the waveform of the induced electromotive force, the drive force by the magnetic coil 100A is small by its nature. Therefore, even if the drive force to the magnetic coil 100A is eliminated for measuring the temperature (the temperature of the electric motor 10) of the magnetic coil 100A, the influence on the rotation of the electric motor 10 can be suppressed.

B. Second Embodiment

Figure 8:
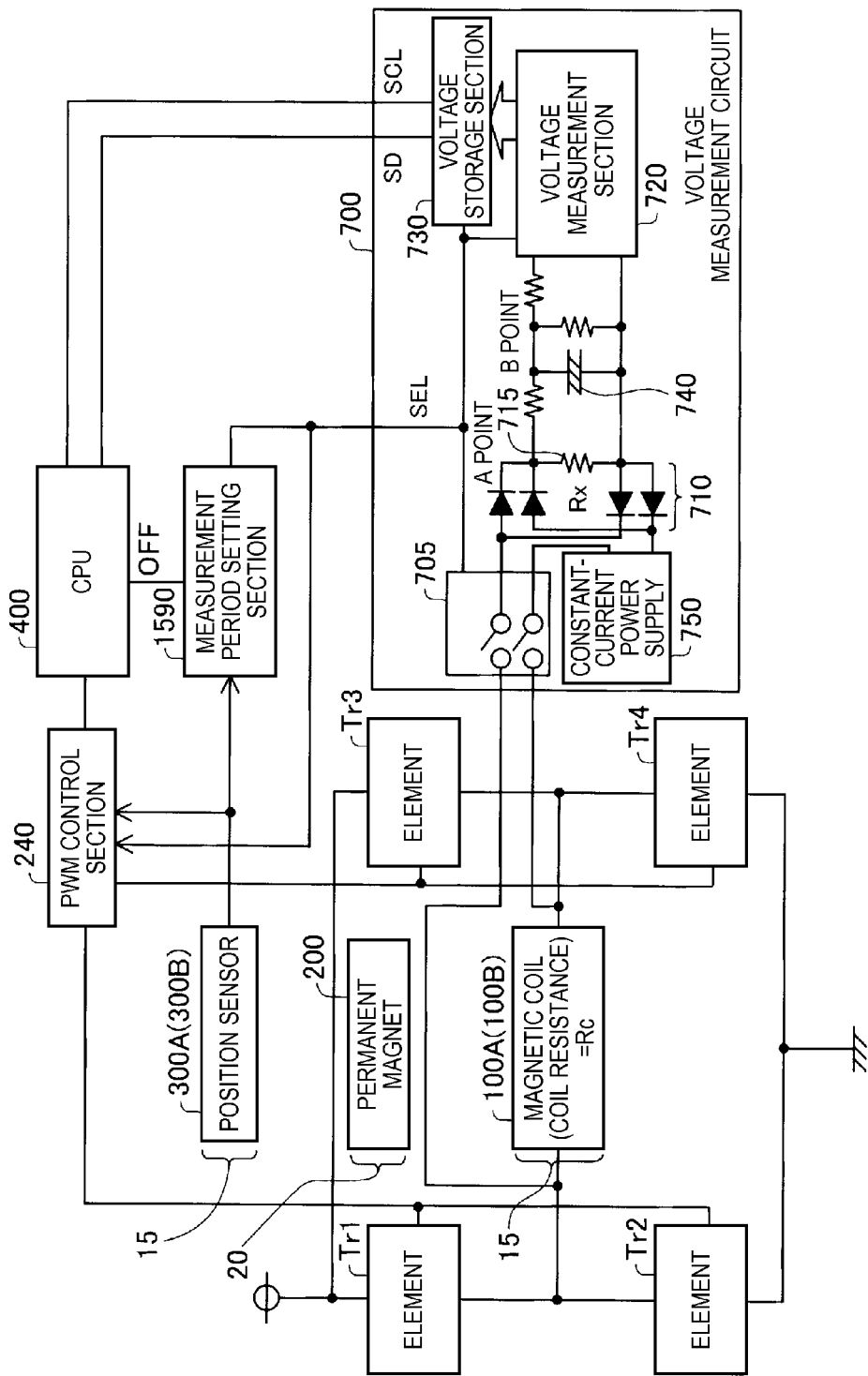
FIG. 8 is an explanatory diagram showing a second embodiment of the invention.

FIG. 8 is an explanatory diagram showing a second embodiment. The second embodiment describes an example in which the non-excitation period NEP is further narrowed to the vicinity of the zero-cross point where the non-excitation counter-electromotive force is not caused, and a constant-voltage or constant-current external power supply is provided on that occasion. Here, the explanation will be presented using a constant-current power supply 750.

The resistor 715 is a megohm level high-value resistance. It should be noted that the resistor 715 can be eliminated (infinite resistance). Therefore, the constant current Ic is supplied from the constant current power supply 750, and in the voltage measurement section 720, the voltage between the both ends of the resistance Rc of the magnetic coil 100A can be measured as the voltage Eb.

The following formula works out, and the resistance Rc can easily be calculated as follows.

$$Rc \times Ic = Eb$$

$$Rc = Eb/Ic$$

Further, in the case of adopting the constant-voltage external power supply, substantially the same thing as in the case of the first embodiment can be applied.

Figure 9:
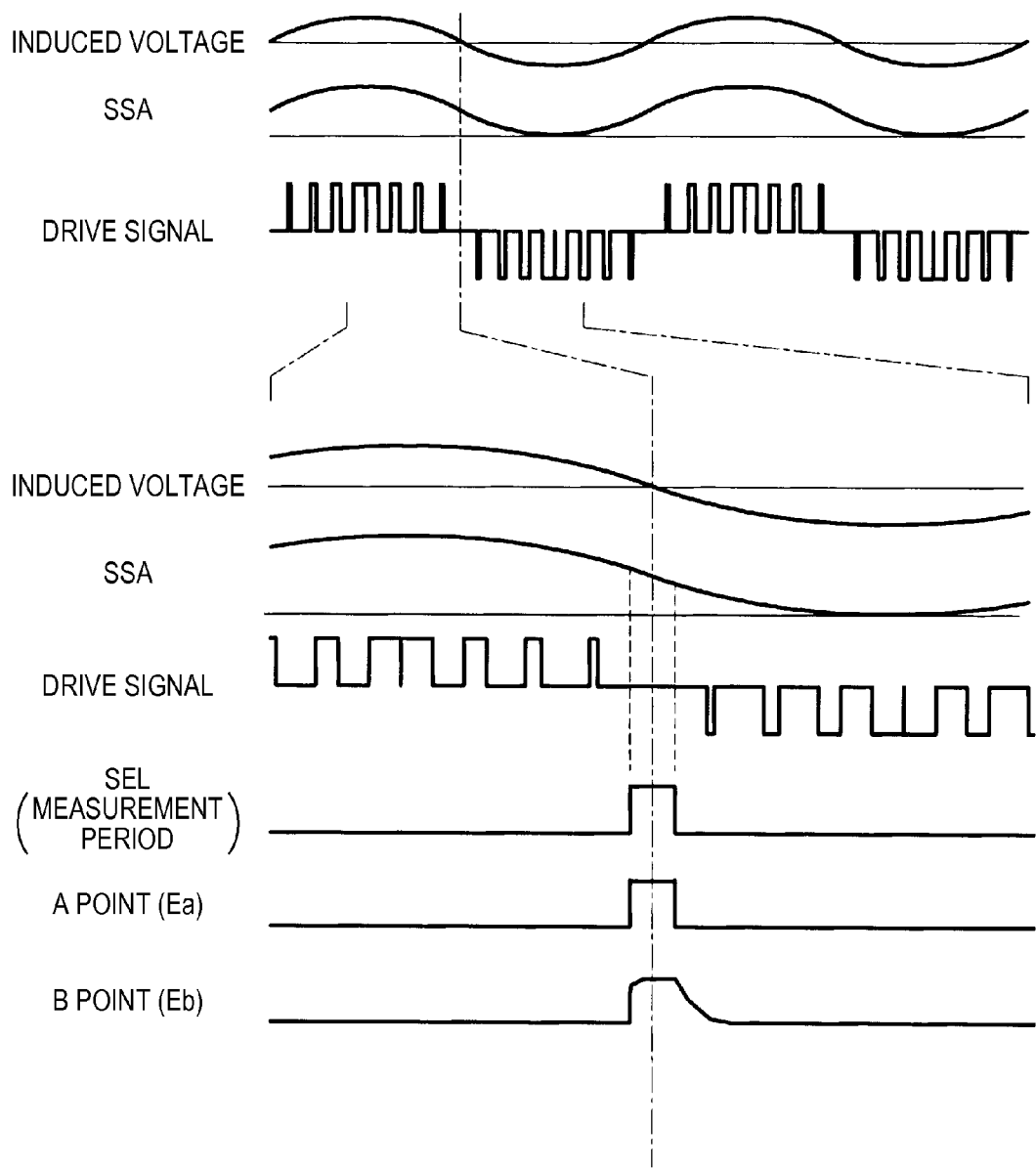
FIG. 9 is a timing chart in the second embodiment.

FIG. 9 is a timing chart in the second embodiment. The second embodiment is different from the first embodiment in the waveform at the A point and the level of the voltage at the B point. Specifically, the waveform at the A point has a concave shape in the first embodiment as shown in FIG. 5, but has a rectangular shape in the second embodiment. Further, the level of the voltage at the B point is higher in the second embodiment. It should be noted that in the first embodiment, the sizes of the waveforms at the A point and the B point vary in accordance with the rotational frequency of the electric motor 10. Specifically, the higher the rotational frequency is, the stronger the induced electromotive force is, and therefore, the larger the sizes of the waveforms at the A point and the B point become. In contrast, in the second embodiment, the size of the waveform depends on the amount of current by the constant-current power supply 750 providing the rotational frequency of the electric motor 10 is lower than a certain rotational frequency, and is therefore not affected by the rotational frequency of the electric motor 10.

Although in the first embodiment the amplitude of the non-excitation induced electromotive force might vary in some cases due to the rotational frequency of the electric motor 10, the length and the phase of the activated period of the measurement period activation signal SEL, it is possible to suppress the influence of the rotational frequency of the electric motor 10, the length and the phase of the activated period of the measurement period activation signal SEL in the second embodiment.

C. Third Embodiment

Figures 10A, 10B:
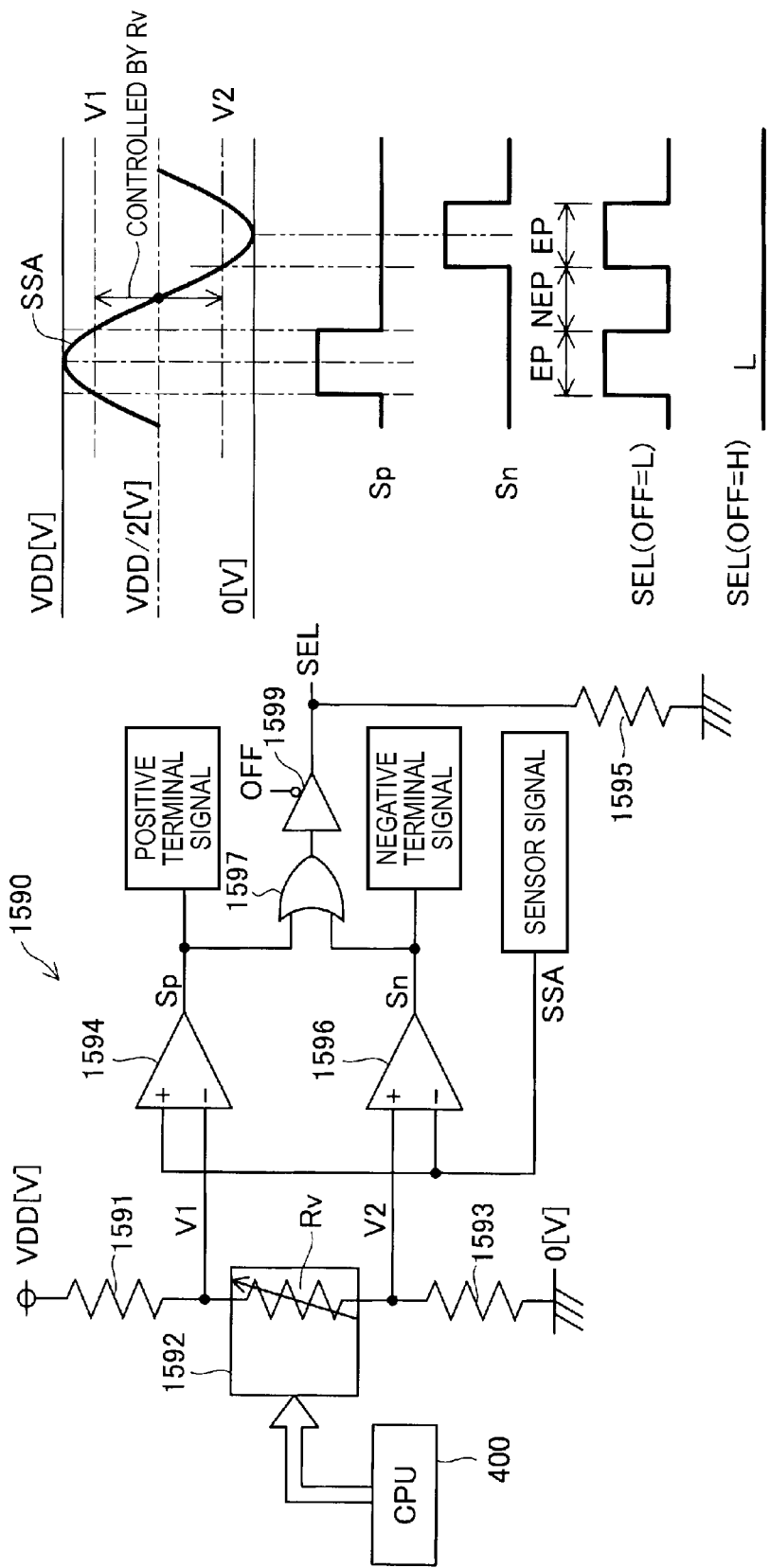
FIGS. 10A and 10B are explanatory diagrams showing a configuration of a measurement period setting section in a third embodiment of the invention.

FIGS. 10A and 10B are explanatory diagrams showing a configuration of a measurement period setting section in a third embodiment. The measurement period setting section 1590 of the third embodiment is different from the measurement period setting section 1590 of the first embodiment in the point that the inverter circuit 1598 is not provided. Since the inverter circuit 1598 is not provided, the activated period and the inactivated period in the first embodiment are reversed to each other. Specifically, the measurement period activating signal SEL is inactivated when the induced electromotive force caused in the magnetic coil 100A exists in the vicinity of the zero-cross point, and is activated in the vicinity of the time point when the induced electromotive force caused in the magnetic coil 100A takes a local maximum value. Since the induced electromotive force is strong at the time point when the induced electromotive force caused in the magnetic coil 100A takes the local maximum value, the non-excitation induced electromotive force is also strong. It should be noted that the measurement period activation signal SEL is input to the PWM section 530 shown in FIG. 2A so as not to activate the drive signals of the magnetic coil 100A in this period, and the drive signals of the magnetic coil 100A are inactivated while the measurement period activation signal SEL is in the activated state.

Figure 11:
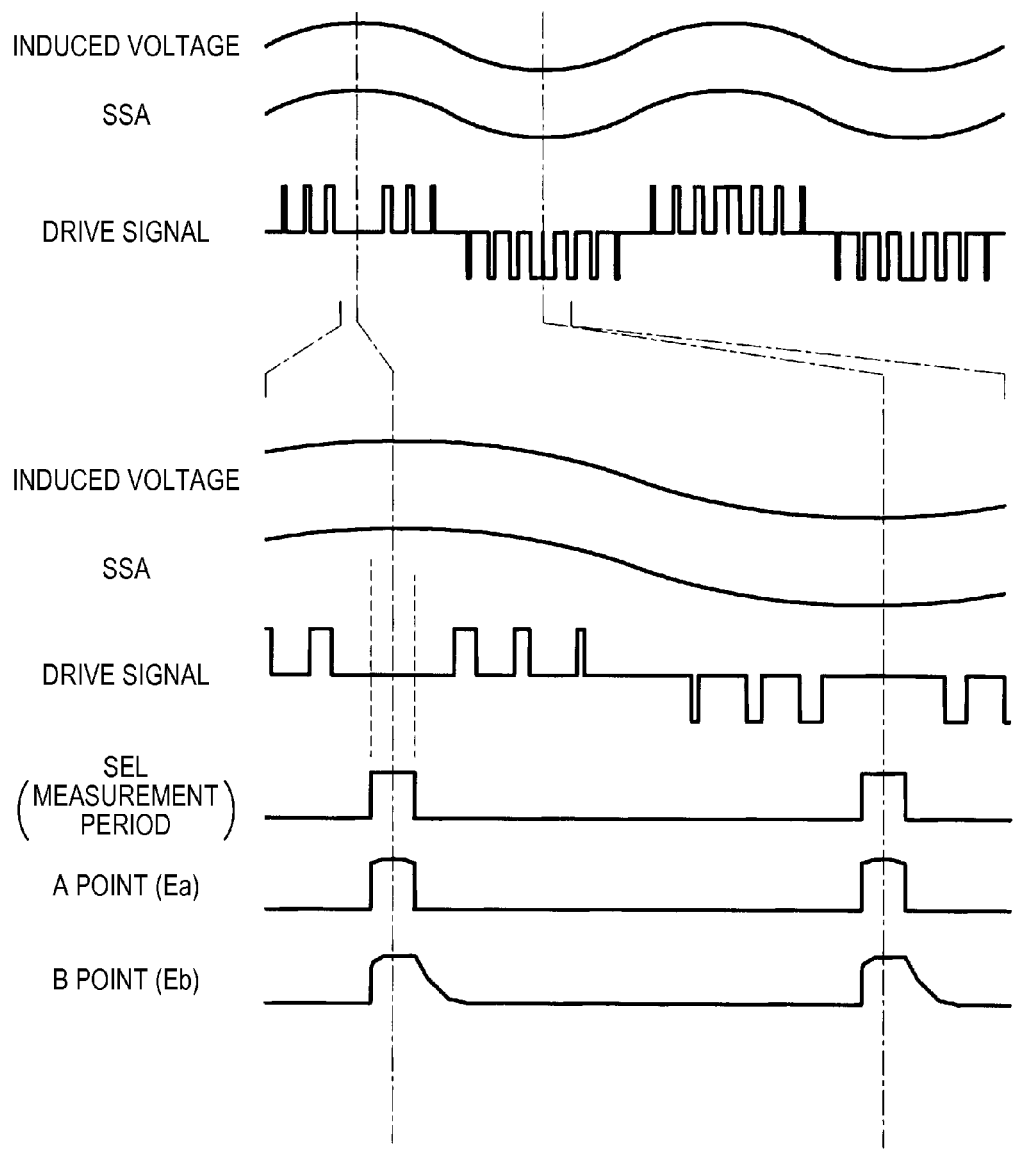
FIG. 11 is an explanatory diagram showing a timing chart in the third embodiment.

FIG. 11 is an explanatory diagram showing a timing chart in the third embodiment. In the third embodiment, the measurement period activation signal SEL is activated in the vicinity of the points where the induced voltage (the induced electromotive force) takes a local maximum value or a local minimum value. In the activated period, since the induced electromotive force is strong, the waveform at the A point has a roughly rectangular shape similarly to the waveform described in the second embodiment.

As described above, according to the third embodiment, the temperature of the magnetic coil is measured when the induced electromotive force caused in the magnetic coil 100A takes a local maximum value. Since the variation in the induced voltage is small when the induced electromotive force is in the vicinity of the local maximum value, accurate temperature measurement becomes possible.

Although in each of the embodiments described above the voltage caused between the both ends of the resistor 715 or the smoothing capacitor 740 is measured, the electric resistance of the magnetic coil 100A is calculated from the voltage value to thereby calculate the temperature of the magnetic coil 100A, it is also possible that the phase and the period in which the measurement period activation signal SEL is activated are determined in advance, and the CPU 400 obtains the temperature of the magnetic coil 100A, namely the temperature of the electric motor 10 from the voltage caused between the both ends of the resistor 715 or the smoothing capacitor 740.

Although in each of the embodiments described above the explanation is presented citing the period including the zero-cross point of the induced electromotive force and the period including the point at which the induced electromotive force takes a local maximum value as an example of the measurement period, it is also possible to adopt the period when the drive is not performed on the magnetic coil 100A such as a period between the two drive pulses of the PWM signal as the measurement period.

D. Modified Examples

Figure 12:
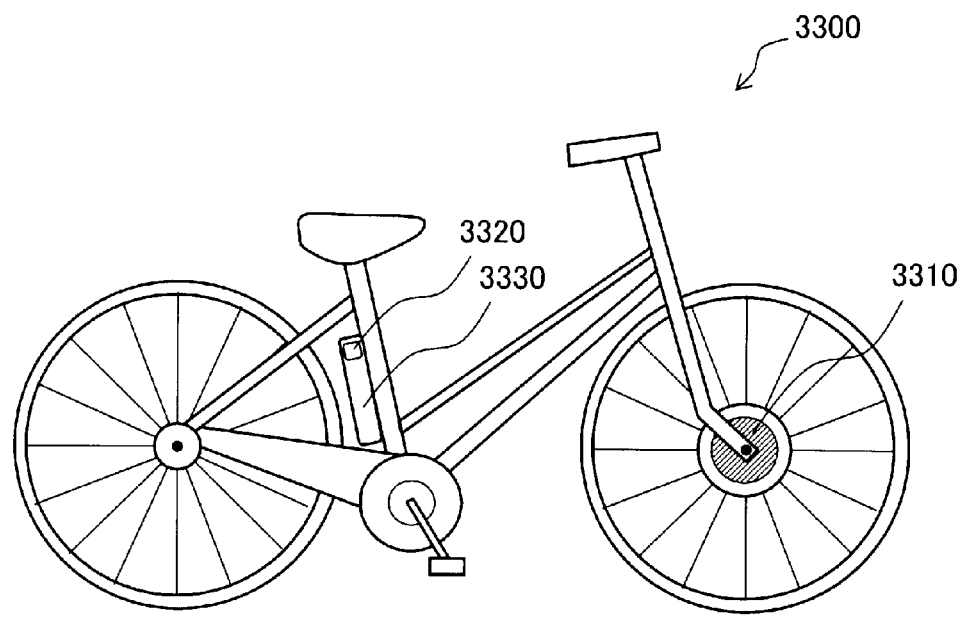
FIG. 12 is an explanatory diagram showing an electric bicycle (an electric power-assisted bicycle) as an example of a movable body using a motor/generator according to a modified example of the invention.

FIG. 12 is an explanatory diagram showing an electric bicycle (an electric power-assisted bicycle) as an example of a movable body using a motor/generator according to a modified example of the invention. A bicycle 3300 has an electric motor 3310 attached to the front wheel, and a control circuit 3320 and a rechargeable battery 3330 disposed on the frame below a saddle. The electric motor 3310 drives the front wheel using the electric power from the rechargeable battery 3330 to thereby assist running. Further, when breaking, the electric power regenerated by the electric motor 3310 is stored in the rechargeable battery 3330. The control circuit 3320 is a circuit for controlling the drive and regeneration of the electric motor. As the electric motor 3310, various electric motors described above can be used. According to this modified example, by performing the torque (current) control for achieving the instantaneous maximum torque characteristics while monitoring the temperature in real time so that the temperature of a coil in the electric motor 10 used in the electric bicycle does not reach a predetermined temperature, excellent acceleration can be achieved.

Figure 13:
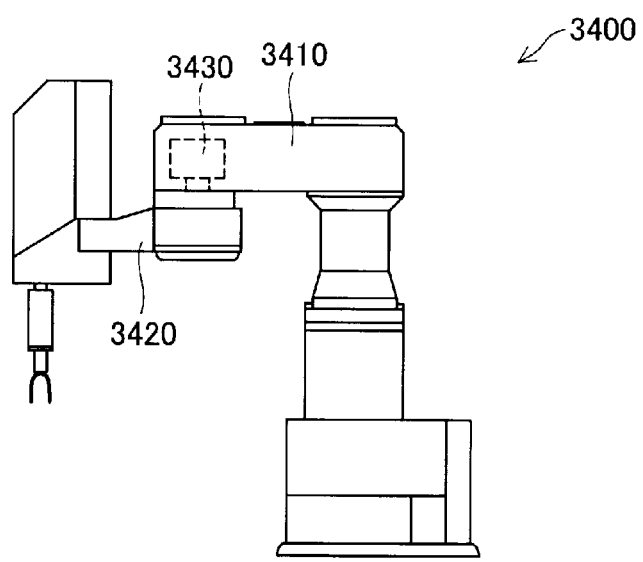
FIG. 13 is an explanatory diagram showing an example of a robot using an electric motor according to another modified example of the invention.

FIG. 13 is an explanatory diagram showing an example of a robot using an electric motor according to another modified example of the invention. A robot 3400 has first and second arms 3410, 3420, and an electric motor 3430. The electric motor 3430 is used when horizontally rotating the second arm 3420 as a driven member. As the electric motor 3430, various electric motors described above can be used. According to this modified example, it is possible to perform the torque (current) control for achieving the instantaneous maximum torque characteristics while monitoring the temperature in real time so that the temperature of a coil in the electromechanical device used for the robot does not reach a predetermined temperature.

Figure 14:
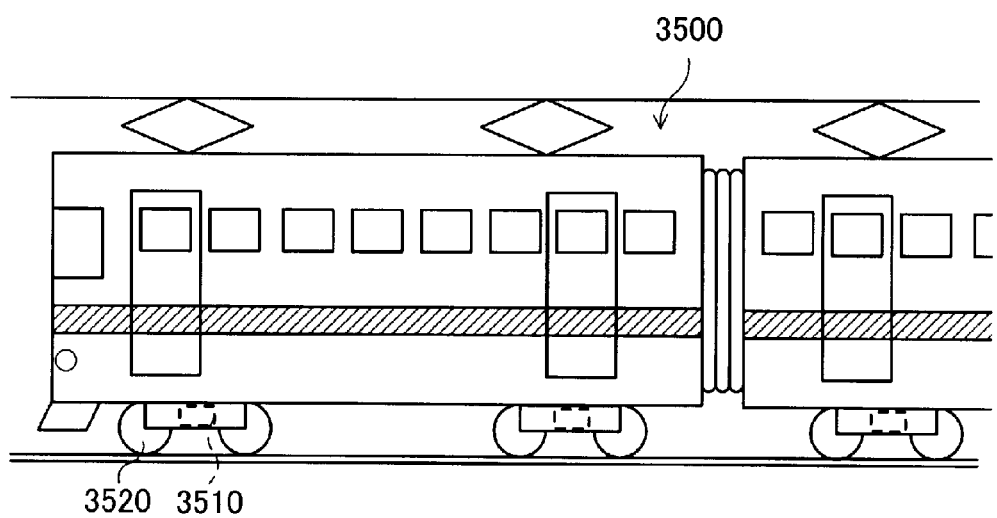
FIG. 14 is an explanatory diagram showing a railroad vehicle using an electric motor according to another modified example of the invention.

FIG. 14 is an explanatory diagram showing a railroad vehicle using an electric motor according to another modified example of the invention. A railroad vehicle 3500 has an electric motor 3510 and wheels 3520. The electric motor 3510 drives the wheels 3520. Further, the electric motor 3510 is used as a generator when breaking the railroad vehicle 3500, and the electric power is regenerated. As the electric motor 3510, various electric motors described above can be used. According to this modified example, by performing the torque (current) control for achieving the instantaneous maximum torque characteristics while monitoring the temperature in real time so that the temperature of a coil in the electric motor 3510 used in the railroad vehicle does not reach a predetermined temperature, excellent acceleration can be achieved.

Although the embodiments of the invention are hereinabove explained based on some specific examples, the embodiments of the invention described above are only for making it easy to understand the invention, but not for limiting the scope of the invention. It is obvious that the invention can be modified or improved without departing from the scope of the invention and the appended claims, and that the invention includes the equivalents thereof.

The present application claims the priority based on Japanese Patent Application No. 2011-028280 filed on Feb. 14, 2011, the disclosure of which is hereby incorporated by reference in its entirety.

What is claimed is:

1. An electromechanical device, comprising:
a rotor;
a stator having a magnetic coil;
a sensor adapted to detect an electric angle of the rotor;
a control section adapted to perform a PWM drive on the magnetic coil based on a signal from the sensor;
a resistor connected in series to the magnetic coil when measuring temperature of the electromechanical device; and
a voltage measurement section adapted to measure a voltage between both ends of the resistor,
wherein the control section calculates an electric resistance of the magnetic coil using the voltage between the both ends of the resistor measured by the voltage measurement section, and then determines the temperature of the magnetic coil using the electric resistance of the magnetic coil in a measurement period in which application of a drive voltage to the magnetic coil is stopped in the PWM drive.

2. The electromechanical device according to claim 1, wherein
the control section selects a period including an inflection point of an induced voltage caused in the magnetic coil as the measurement period, and performs the measurement of the voltage between the both ends of the resistor in the measurement period.

3. The electromechanical device according to claim 1, wherein
the control section includes a constant-current source adapted to make a current flowing through the magnetic coil constant in the period in which the application of the drive voltage to the magnetic coil is stopped, and
the control section selects a period including an inflection point of an induced voltage caused in the magnetic coil as the measurement period, and performs the measurement of the voltage between the both ends of the resistor in a condition of making the current flowing through the magnetic coil constant using the constant-current source in the measurement period.

4. The electromechanical device according to claim 1, wherein
the control section selects a period including a point at which an induced voltage caused in the magnetic coil takes one of a local maximum value and a local minimum value as the measurement period, and in the measurement period, stops driving the magnetic coil and performs the measurement of the voltage between the both ends of the resistor.

5. The electromechanical device according to claim 1, wherein
the control section includes a table used for calculating the temperature of the magnetic coil from the voltage between the both ends of the electric resistance measured.

6. A movable body comprising the electromechanical device according to claim 1.

7. A movable body comprising the electromechanical device according to claim 2.

8. A movable body comprising the electromechanical device according to claim 3.

9. A movable body comprising the electromechanical device according to claim 4.

10. A movable body comprising the electromechanical device according to claim 5.

11. A robot comprising the electromechanical device according to claim 1.

12. A robot comprising the electromechanical device according to claim 2.

13. A robot comprising the electromechanical device according to claim 3.

14. A robot comprising the electromechanical device according to claim 4.

15. A robot comprising the electromechanical device according to claim 5.

16. A method of measuring temperature of an electromechanical device, comprising:
setting a measurement period in which the temperature of the electromechanical device is measured;
stopping driving a magnetic coil of the electromechanical device in the measurement period;
connecting a resistor in series to the magnetic coil;
measuring a voltage between both ends of the resistor in the measurement period;
calculating electric resistance of the magnetic coil using the voltage; and determining the temperature of the magnetic coil from a value of the electric resistance.

\* \* \* \* \*